United States Patent [19]

Prawdzik et al.

[11] Patent Number: 4,689,102
[45] Date of Patent: Aug. 25, 1987

[54] METHOD FOR THE PRODUCTION OF ABRASION-RESISTANT DECORATIVE LAMINATES

[75] Inventors: John Prawdzik, Dover; Norman F. Maxim, Lunenburg, both of Mass.; William C. Lane, Chillicothe, Ohio; Christo Antonio, Princeton, Mass.

[73] Assignee: Technographics Fitchburg Coated Products, Inc., Moosic, Pa.

[21] Appl. No.: 812,144

[22] Filed: Dec. 31, 1985

Related U.S. Application Data

[63] Continuation-in-part of Ser. No. 694,961, Jan. 25, 1985, abandoned.

[51] Int. Cl.⁴ ............................................. B32B 31/12
[52] U.S. Cl. ................................. 156/235; 156/247; 156/279; 156/288; 156/289; 156/307.5; 428/143; 428/323; 428/329; 428/331; 428/503
[58] Field of Search ............... 428/143, 144, 323, 329, 428/331, 503, 526, 531; 156/247, 288, 289, 307.4, 279, 323, 235

[56] References Cited

U.S. PATENT DOCUMENTS

| | | | |
|---|---|---|---|
| 3,135,643 | 6/1964 | Michl | 428/331 |
| 4,030,955 | 6/1977 | Antonio et al. | 156/289 |
| 4,263,081 | 4/1981 | Scher et al. | 428/172 |
| 4,293,360 | 10/1981 | Loft et al. | 156/289 |
| 4,327,141 | 4/1982 | Scher et al. | 428/172 |
| 4,430,375 | 2/1984 | Scher et al. | 428/331 |

Primary Examiner—Paul J. Thibodeau
Attorney, Agent, or Firm—Peter J. Georges

[57] ABSTRACT

An improved release medium is disclosed for use in the production of decorative laminates by both low or high pressure consolidation. The release medium comprises a self-sustaining release sheet having at least one of its surfaces coated with a composition comprised of mineral particles dispersed in a resinous matrix. The release medium may be used to apply an abrasion-resistant coating to the surface of a decorative laminate during production of the laminate by pressure consolidation.

34 Claims, 4 Drawing Figures

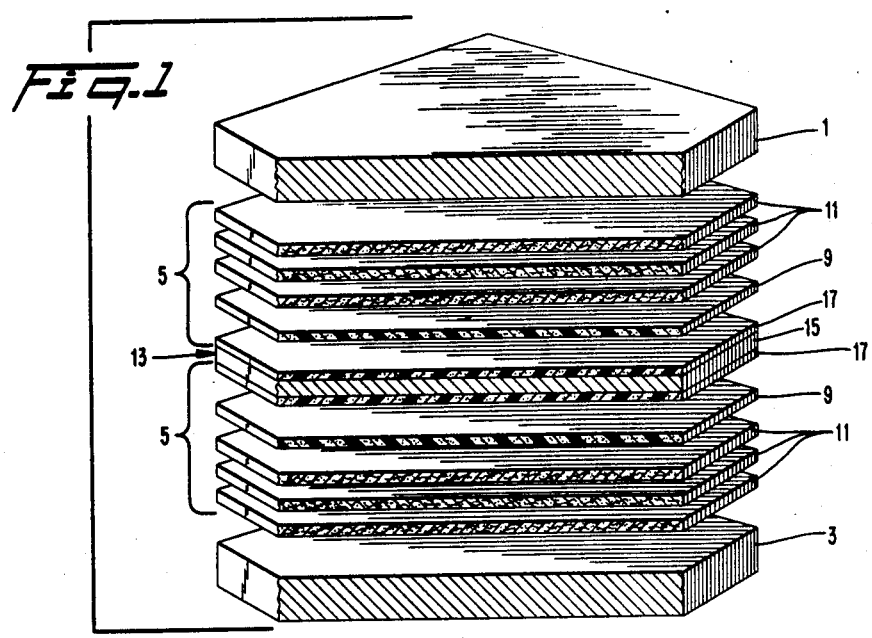
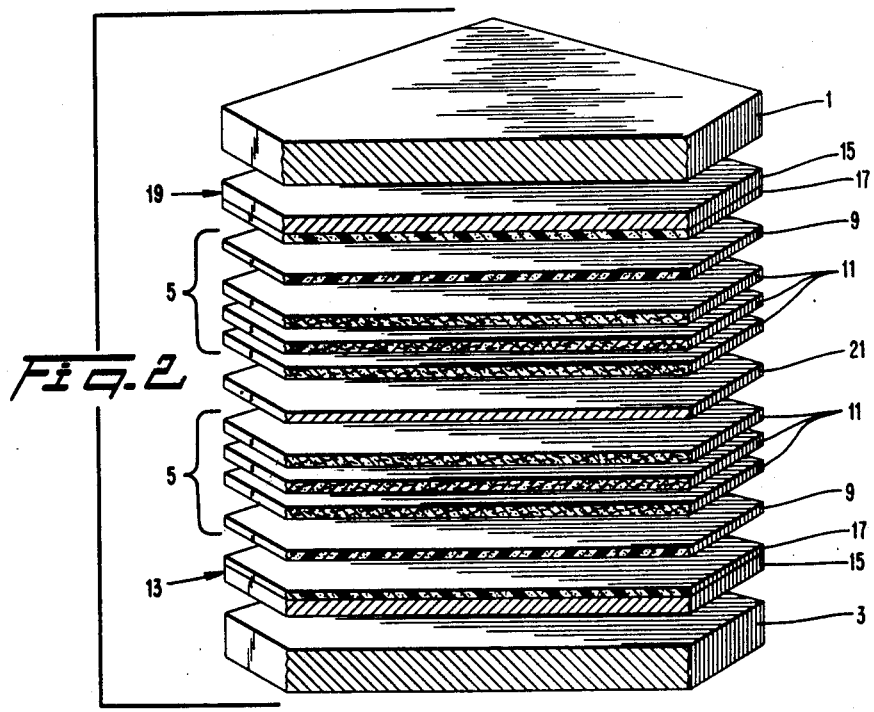

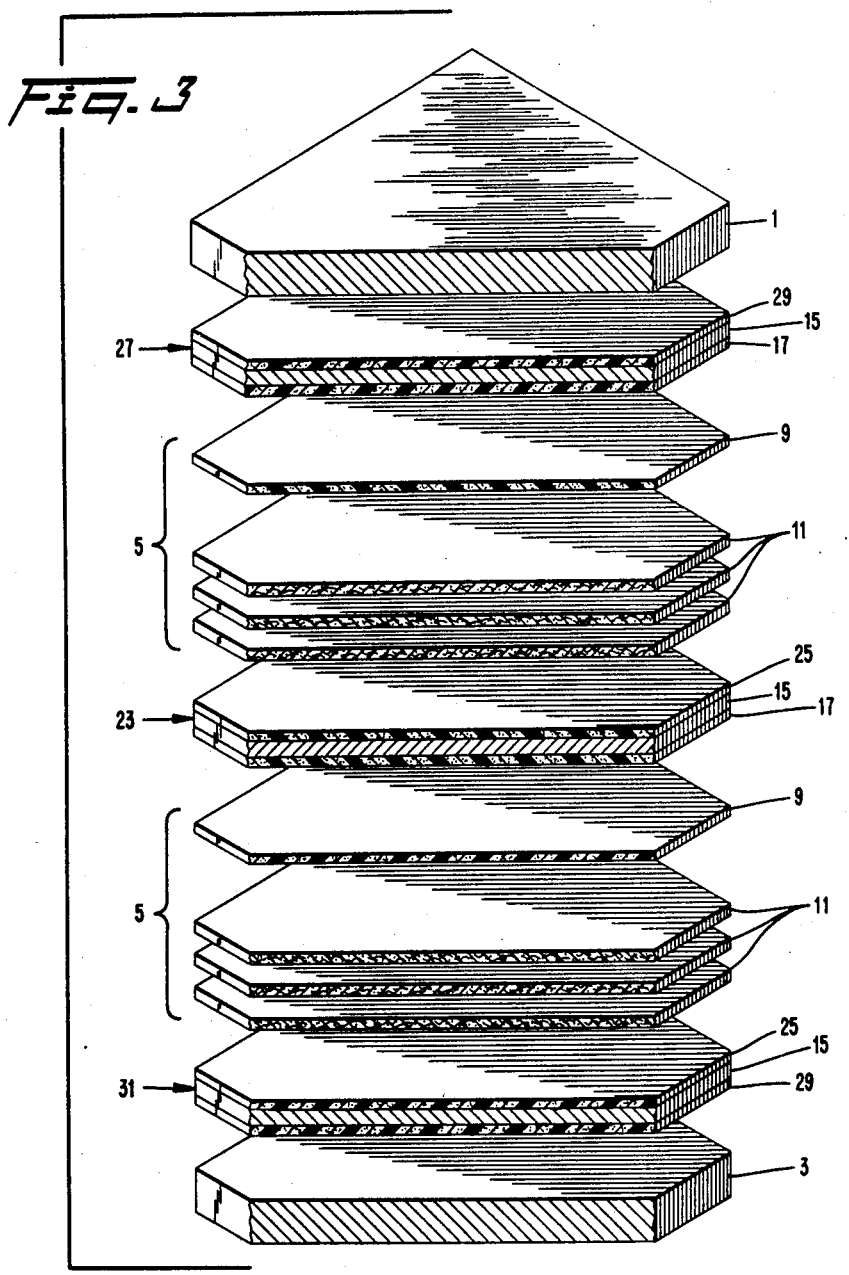

METHOD FOR THE PRODUCTION OF ABRASION-RESISTANT DECORATIVE LAMINATES

CROSS-REFERENCE TO RELATED APPLICATIONS

The present application is a continuation-in-part application of U.S. patent application Ser. No. 694,961, filed Jan. 25, 1985, now abandoned.

BACKGROUND OF THE PRESENT INVENTION

The present invention is directed to a method for the production of decorative laminates which are employed in conjunction with a substrate such as particle board for use in countertops, furniture and the like.

Decorative laminate products may be produced by both low and high pressure lamination processes. In low pressure lamination processes, the pressure employed is less than about 500 psi while high pressure lamination processes employ processes of at least 500 psi.

Various methods can be employed to provide decorative laminates by low pressure lamination. For example, a single opening, quick cycle press can be used where a saturated decor sheet is laminated to a sheet of plywood or particle board. A "continuous laminator" can be used where one or more layers of treated (resin saturated) paper are pressed into a unitary structure as the layers move through continuous laminating equipment between plates, rollers or belts. Alternatively, a laminated sheet (continuous web or cut to size) may be pressed onto a particle board, etc. and a "glue line" used to bond the laminated sheet to the board. Single or multiple opening presses may also be employed which contain several laminates (similar to high pressure presses) but at a pressure below 500 psi.

In making decorative laminates via high pressure lamination, a plurality of sheets are impregnated with a thermosetting resin and stacked in superimposed relation with a decorative sheet placed on top. This assembly is then heat and pressure consolidated at a pressure of at least 500 psi. Generally, more than one laminate is formed at one time by inserting a plurality of sheet assemblies in a stack with each assembly being separated by a release medium which allows the individual laminates to be separated after heat and pressure consolidation.

The laminates so formed are then bonded to a substrate such as plywood, hardboard, asbestos board, particle board, and the like by the use of adhesives such as contact adhesives, urea-formaldehyde, white glues (polyvinyl acetate emulsions), hot melts, phenolic or resorcinol formaldehyde, epoxy, coal tar, animal glues and the like.

It has been found to be desirable during the production of such laminates by either low or high pressure lamination processes to impart abrasion-resistant characteristics to the decorative surface portion of the laminate to enhance the utility of such laminates as table and countertops, wall panels and floor surfacing.

Such abrasion resistance has in the past been imparted to decorative laminates having a printed decorative sheet by means of an applied overlay sheet which provided a transparent barrier over the decorative print sheet. Resin coatings have also been applied to the surface of the laminate which coatings contain abrasion-resistant mineral particles. Note in this regard U.S. Pat. Nos. 3,135,643; 3,373,070; 3,373,071; 3,798,111; 3,928,706; 4,255,480; 4,263,081; 4,305,987; 4,322,468; 4,327,141; 4,395,452; 4,400,423; and 4,430,375.

The above-noted methods, while generally satisfactory results, are undesirable in that they require either the use of additional materials (i.e., the overlay sheet) or the use of additional coating steps. Such disadvantages result in lessened efficiency and cost-effectiveness of the abrasion-resistant characteristics thereby provided.

OBJECTS AND SUMMARY OF THE INVENTION

It is therefore an object of the present invention to provide an improved release medium for use in the production of both low and high pressure decorative laminates.

It is another object of the present invention to provide an improved release medium for use in the production of high pressure decorative laminates which enables multiple laminates to be formed having abrasion-resistant characteristics.

It is yet another object of the present invention to provide an improved release medium for use in the production of low and high pressure decorative laminates whose use may enable the use of an overlay sheet to be avoided.

It is still yet another object of the present invention to provide an improved method for the production of low and high pressure decorative laminates wherein the use of an overlay sheet may be avoided.

It is still yet another object of the present invention to provide an improved method for the production of decorative laminates by means of high pressure consolidation wherein increased efficiency is achieved.

In accordance with the present invention, there is thus provided a release medium for use in the production of decorative laminates by pressure consolidation comprised of a self-sustaining release sheet, the improvement wherein the release sheet has at least one surface coated with a composition comprised of abrasion-resistant mineral particles dispersed in a resinous matrix.

In another aspect of the present invention, there is provided a method for the production of decorative laminates comprising:

(a) providing a release medium comprised of a self-sustaining release sheet having one and opposing surfaces, at least one of said surfaces of said release medium including a coating of a composition comprised of abrasion-resistant mineral particles dispersed in a resinous matrix;

(b) providing a decorative sheet and positioning said decorative sheet adjacent a self-sustaining substrate;

(c) positioning said release medium adjacent said decorative sheet to form an assembly comprised of said release medium, said decorative sheet and said self-sustaining substrate, said release medium being positioned adjacent said decorative sheet in a manner such that an abrasion-resistant coating is applied to the surface of said decorative sheet by the application of heat and/or pressure to said assembly; and (d) applying sufficient heat and/or pressure to said assembly to provide a decorative laminate comprised of said decorative sheet and said self-sustaining substrate which decorative sheet includes an abrasion-resistant coating of a composition comprised of abrasion-resistant mineral particles dispersed in a resinous matrix.

In yet another aspect of the present invention, there is provided a method for the production of decorative laminates comprising:

(a) providing at least one release medium comprised of a self-sustaining release sheet having opposing first and second surfaces;

(b) providing at least one decorative laminate sheet assembly comprised of at least one core sheet and a decorative sheet;

(c) positioning said at least one release medium adjacent said decorative sheet of said at least one decorative laminate sheet assembly; and (d) forming at least one decorative laminate from said at least one decorative laminate sheet assembly by the application of heat and/or pressure; the improvement wherein said at least one release medium includes on a surface adjacent said decorative sheet a coating of a composition comprised of abrasion-resistant mineral particles dispersed in a resinous matrix whereby an abrasion-resistant coating is formed on the surface of said decorative sheet of said at least one decorative laminate during said application of heat and/or pressure.

BRIEF DESCRIPTION OF THE DRAWINGS

FIGS. 1-3 are exploded views of decorative laminate sheet assemblies about to be formed into decorative laminates in a high pressure laminating press.

DETAILED DESCRIPTION OF THE INVENTION

Figure 4:
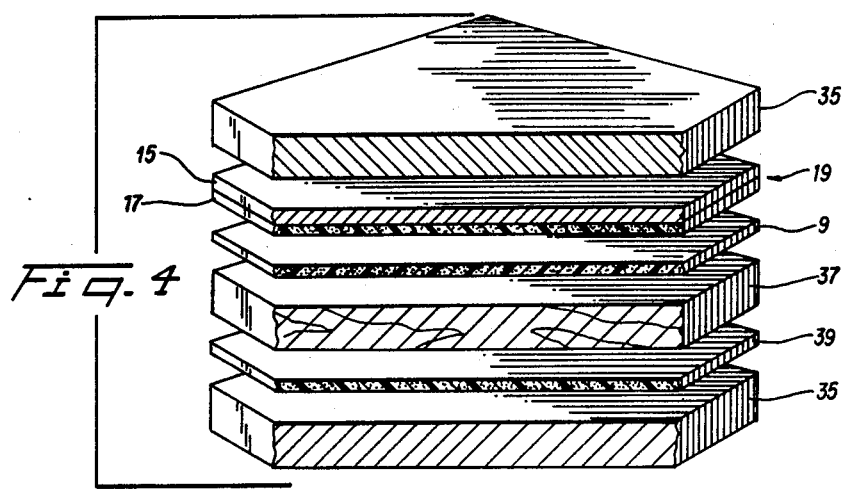
FIG. 4 is an exploded view of a decorative sheet assembly about to be formed into a decorative laminate in a low pressure laminating process.

The present invention will be described in detail in conjunction with reference to FIGS. 1-4, with like elements being numbered identically.

FIGS. 1-3 depict a conventional high pressure laminating press having press assemblies 1, 3 which are employed to consolidate by means of heat and/or pressure superimposed decorative laminate sheet assemblies 5 which are placed in the press. The sheet assemblies 5 upon consolidation yield a decorative laminate having a decorative surface which surface if printed would normally underlie an overlay sheet whose use may be avoided by practice of the present invention. The sheet assemblies 5 which are illustrated include a decorative sheet 9 which may comprise either a printed sheet or a solid color sheet.

Several layers of core stock 11 (e.g., kraft paper) are further employed beneath the decorative sheet 9 to impart the necessary rigidity to the laminate upon formation and/or consolidation. The core stock sheets are impregnated with a thermosetting resin in a conventional manner in order to enhance their function with regard to imparting rigidity. Preferably a phenolic resin is so employed. The decorative sheet is also impregnated with a thermosetting resin, with a clear melamine-formaldehyde resin preferably being used in the decorative sheet. The use of such resins in the noted sheets is conventional and the selection of alternative thermosetting resins is within the skill of the routineer in the art.

By way of explanation, in the disclosed embodiment of FIG. 1, the press assembly 1 would normally consist of a heavy press platen capable of providing the necessary heat and/or pressure during lamination, an optional adjacent press plate and padding stock (e.g., several layers of kraft paper). The press assembly 3 in such an embodiment would normally consist of a platen, a carrier plate, padding stock and a steel caul or press plate (either textured or polished). In order to simplify the Figures these various elements have been collectively identified as press assemblies 1, 3.

Also, while the decorative sheet assemblies have been depicted in FIG. 1 as having the decorative surfaces of the assemblies facing each other in a face-to-face relationship, certainly the orientation of the assemblies could be such that they are aligned in a back-to-back relationship as depicted in FIG. 2 or aligned in a face-to-back relationship as depicted in FIG. 3. For purposes of the description of the invention, reference to the "uppermost" surface of a decorative sheet assembly is intended to make reference to the decorative surface of the assembly regardless of how the assembly is oriented within the press.

The basis of the present invention resides in the use of the release medium 13 during pressure consolidation of the sheet assemblies to form a decorative laminate. The release medium 13 comprises release sheet 15 having a coating 17 on at least one surface consisting of a composition comprised of abrasion-resistant mineral particles dispersed in a resinous matrix. The remaining surface may either remain uncoated, be coated with the same abrasion-resistant composition, be coated with a release coating or be coated with a non-sanding coating.

The release sheet 15 may be comprised of a variety of materials which do not soften and/or become tacky under the conditions employed during the pressure consolidation process. For example, synthetic resins may be employed including but not being limited to polyolefins and polyesters such as polypropylene, polybutylene, polyethylene terephthalate, etc. Polyurethane films may also be used. Other exemplary release sheets include paper, metallic foil or paper-metallic foil laminates wherein single or double layers of foil are employed (e.g., where the paper is sandwiched between two foil layers). Aluminum foil is the preferred foil in the event that the release sheet comprises a metallic foil or paper-metallic foil laminate.

The thickness of the release sheet 15 is not critical to the operation of the present invention and is generally only limited by cost and ease of handling. Generally, the thickness of the release sheet will be at least about 0.5 mil and preferably ranges from about 1 to 5 mils.

The abrasion-resistant mineral particle-containing coating 17 comprises abrasion-resistant mineral particles dispersed in a suitable resinous matrix. Exemplary particles include but are not limited to particles of silica, alumina, alundum, corundum, emery, spinel, tungsten carbide, zirconium boride, titanium nitride, tantalum carbide, beryllium carbide, silicon carbide, aluminum boride, boron carbide and diamond dust. Desirably, such materials exhibit a hardness of at least 7 on the Moh hardness scale.

The selection of the most suitable material is dependent upon several factors including color compatibility, hardness, cost, particle size, etc. For example, silica and alumina are essentially colorless materials whose presence would not detrimentally detract from the appearance of the decorative sheet.

Such particles would generally be employed in a particle size range of from about 10 micron average particle size up to about 75 micron average particle size, and preferably between about 20 and 50 microns. The use of particles within the noted range enables the desired abrasion resistance to be achieved without excessive interference with the appearance of the decorative laminate. It is also desirable for the particles to be sized fairly closely together such that the difference between the smallest and largest average particle sizes is not significant. The abrasion-resistant particles are dispersed in a suitable resinous matrix that is capable of transfer to the adjacent decorative laminate sheet assembly during the conditions employed during pressure consolidation while forming a substantially continuous film. While various resins are suitable for use as the matrix resin, the resin is preferably selected from the same group of resins which are conventionally employed to impregnate the decorative sheet in order to enhance the compatibility of the resins from a visual standpoint. Most preferably, either the same melamine (e.g., melamine aldehyde) resin or compatible melamine resins are employed in both the decorative sheet impregnation and as the matrix resin. Polyester and acrylic resins may also be employed. Phenolic resins are not desirable as they are susceptible to discoloration. Exemplary melamine resins include Cymel 409 and Cymel 412 (American Cyanamid).

The particles comprise approximately from about 2 to 15 percent by weight of the matrix resin, based on the weight of the resin. The abrasion-resistant coating may be applied to the surface or surfaces of the release sheet by any suitable coating means. One skilled in the art can readily determine an acceptable means by which the release sheet can be coated with the abrasion-resistant coating. The mixture of resin and mineral particles are generally combined in admixture with a solvent for the resin. For example, the resin may be admixed with a solvent in weight ratios ranging from about 1:1 to 4:1, respectively. In the case of various water-soluble melamine-formaldehyde resins, either water or alcohol-based solvents may be employed, with water temperatures in the range of about 50° to 95° C., preferably from about 60° to 70° C., being employed during formation of the coating.

The coating may be applied in various amounts to the release sheet, with the coating being applied in an amount sufficient to ensure that abrasion-resistant properties are transferred to the decorative sheet during lamination in the form of an abrasion-resistant coating. For example, the coating is generally applied in amounts ranging from about 0.001 to 0.006 lbs/ft$^2$ of the release sheet. The coating thickness will generally range from about 0.4 to 1.0 mil. Once applied, the resin is dried to the B stage by suitable means such as in a forced air oven at a sufficient temperature and for a sufficient time (e.g., at from 100° to 110° C. for a few minutes).

It is also advantageous for the coating composition to include a viscosity-improver in order to increase the viscosity of the abrasion-resistant composition. The presence of such an additive serves to prevent both disadvantageous settling of the mineral particles within the resin and clumping of the particles such that the coating which is eventually transferred to the decorative sheet effectively provides the desired abrasion-resistant properties. The additive also helps to anchor the coating to the substrate. Exemplary viscosity-improvers include but are not limited to known additives such as carboxymethylcellulose, hydroxypropylcellulose, methylcellulose, polyvinyl alcohol, polyvinyl pyrrolidone, etc. Such viscosity-improvers are advantageously employed in an amount ranging from about 0.5 to 4.0 percent by weight, based on the weight of the coating composition, preferably from about 1.0 to 4.0 percent by weight.

Furthermore, it has been found advantageous for a surface active agent to be employed in the composition if the composition is to be applied to a release sheet whose surface is not easily wettable by the resin-based composition (such as caul stock). In such an instance, the presence of the surface active agent enables the composition to be uniformly spread across the surface of the substrate without disadvantageous beading of the composition. Such surface active agents, if present, are advantageously employed in amounts ranging from about 0.01 to 1.0 percent by weight, based on the weight of the coating composition, preferably from about 0.1 to 0.5 percent by weight. The amount of surfactant employed will vary as to the type of substrate to which the coating is applied. That is, application of the coating to silicone-treated caul stock will necessitate the use of more surface active agent than will the application of the coating to aluminum foil. Exemplary surface active agents include Zonyl FSJ (DuPont) and Strodex PK90 (Dexter Chemical Co.).

While the FIG. 1 embodiment is directed to the use of a release medium having the abrasion-resistant particle-containing coating 17 on both sides of the release sheet 15 in order to apply an abrasion-resistant surface to the adjacent decorative sheet assemblies 5 oriented in a face-to-face relationship, certainly only a single abrasion-resistant coating need be employed.

For example, FIG. 2 depicts the use of a release medium 19 having a release sheet 15 and a single abrasion-resistant coating 17 applied thereto. The remaining surface of the release sheet remains uncoated. In such an embodiment, the decorative sheet assemblies 5 are oriented in a back-to-back relationship within the lamination process. A conventional release sheet 21 is placed between the adjacent back portions of the sheet assemblies to ensure separation of the assemblies from each other upon lamination. The use of such conventional release sheets is known to those skilled in the art and will not be discussed in greater detail.

It is also feasible for other types of coatings to be employed in conjunction with the abrasion-resistant coating on the release medium. As depicted in FIG. 3, a release medium 23 is employed having a release sheet 15 having an abrasion-resistant coating 17 and non-sanding coating 25 thereon. In such an embodiment the sheet assemblies 5 can be advantageously positioned within the press in a face-to-back relationship.

The non-sanding coating 25 is comprised of a material that is capable of transfer to the opposing surface of the sheet assembly during the pressure consolidation step while forming a substantially continuous film. As a result, one surface of the decorative laminate thus produced will be amenable to adhesive bonding to a supporting substrate without the need for additional pre-adhesion preparation of that surface (e.g., by the sanding of the surface). The other surface will have abrasion-resistant properties imparted to it as a result of the pressure consolidation step.

Exemplary materials for use as the non-sanding coating 25 include but are not limited to polyvinyl alcohol, animal glue and starch. Animal gelatin, a more refined type of animal glue, also functions satisfactorily and is intended to be included with the scope of the term animal glue. Polyvinyl alcohol is the preferred material for use as the non-standing coating.

The thickness of the non-standing coating is also not critical but will generally be at least about 0.10 mil in thickness. The non-sanding coating preferably ranges from about 1 to 4 mils in thickness.

An exemplary non-sanding coating composition which may be employed comprises on a dry solid basis:

Polyvinyl alcohol: 100 parts
Talc: 43 parts
Calgon (sodium hexamethaphosphate): 10 parts
Formaldehyde: 1.33 parts
Gylcerol: 1.33 parts A coating batch may be prepared by mixing a 20 percent aqueous solution of polyvinyl alcohol with a 50 percent slurry of talc and Calgon with the proportion being above set forth. A 37 percent aqueous solution of formaldehyde and a 40 percent solution of glycerol are then added to the batch in proportional amounts as above set forth. The batch is then diluted with water so as to provide a viscosity of 800 centipoises so as to make the same suitable for coating.

Fillers, cross linking agents and wetting agents may be added to the non-sanding coating 25. The amounts of the non-sanding coating employed should be sufficient to form a substantially continuous film upon transfer to the opposing surface during heat and pressure consolidation. Generally, this requires at least about 10 percent of the coating to be polyvinyl alcohol or other suitable material on a dry solid basis. Preferably, the coating comprises is at least about 40 percent by weight of polyvinyl alcohol or other material.

While not necessary, a filler such as talc may be added to improve the bond especially when an adhesive such as ureaformaldehyde is used to adhere the laminate to its supporting substrate.

Cross-linking agents such as formaldehyde and/or glyoxal may also be used to ensure that polyvinyl alcohol is water insolubilized to prevent moisture swell in the finished laminate.

A wetting agent such as that marketed under the trademark Calgon (sodium hexamethaphosphate) may be added to enhance the wettability of the surface.

Alternatively, the release medium may employ a release coating in conjunction with the abrasion-resistant coating as noted in the release medium 27 of FIG. 3 which has release coating 29 on one surface of release sheet 15 and an abrasion-resistant coating 17 on the other surface. Abrasion-resistant properties are thus transferred to the decorative surface of the adjacent sheet assembly upon lamination while the release coating 23 serves to enhance separation of the release medium 21 from the adjacent press assembly upon lamination.

At the bottom of the stack a release medium 31 may be employed which imparts non-sanding properties to the bottom surface of the adjacent sheet assembly by transfer of non-sanding coating 25 during lamination. Release coating 29 on the remaining surface of the release medium 31 serves to enhance separation from the adjacent press assembly upon lamination.

The release coating 29 may comprise a variety of conventional materials which enable the release medium 27, 31 to readily separate from the adjacent press assembly subsequent to the formation of the laminate and completion of the lamination process. Typically, a silicone-containing layer will be employed as the release coating although various stearates (such as marketed by DuPont under the trademark Quillon), fluorocarbons, waxes or oils may also be employed. Fillers may also be added to the release coating to control gloss on the face of the laminate. The thickness of the release coating is also not critical although the coating should be present in an amount sufficient to enable the desired separation to occur.

During the lamination process itself, conditions of temperature and pressure are employed sufficient to form the requisite laminates without incurring damage due to excessive heat or pressure. For example, during high pressure lamination, pressures in the range of about 700 to 1100 psi and temperatures in the range of about 130° to 230° C. may be employed. Preferably, a pressure of about 850 psi and a temperature of about 160° C. are employed. Time periods of 45 to 90 minutes are usually sufficient to achieve the desired lamination. Most advantageously, textured caul plates are employed during the lamination step to enhance the abrasion-resistant properties which are imparted to the decorative laminate.

Subsequent to lamination the resulting consolidated assemblies may be easily removed from the press and separated from each adjacent release medium. The abrasion-resistant coating will also be successfully transferred to the opposing decorative surface of the assembly as will any non-sanding coating that may be present. In the event that a printed decorative sheet is employed instead of a solid color sheet, the application of the abrasion-resistant resinous coating to the surface of the printed decorative sheet will enable the use of an overlay sheet to be avoided. The laminates can subsequently be attached to a suitable supporting substrate (e.g., particle board) using a conventional adhesive such as urea-formaldehyde and phenol resorcinol.

The release medium of the present invention may also be employed in conjunction with low pressure lamination processes presently conducted in the industry. In such processes a decorative sheet is bonded to a supporting self-sustaining substrate by the application of heat and/or pressure. The resultant decorative laminate is subsequently employed in the production of various articles of manufacture such as furniture.

Exemplary supporting self-sustaining substrates include but are not limited to particle board, medium density fiberboard and hardboard. In contrast to the high pressure lamination processes, a multitude of core sheets are not employed which are consolidated by pressure into a composite supporting substrate. Instead, the decorative sheet is applied to a supporting substrate to form a decorative laminate which is later used in the manufacture of an article such as furniture having a decorative surface. Such a difference enables the bonding process to be carried out under less pressure than employed with the high pressure process since sufficient pressure need only be employed to bond the decorative sheet to the supporting substrate.

Alternatively, the decorative sheet may be bonded during the lamination process to a relatively thin self-sustaining supporting sheet, with the resulting decorative laminate which is formed being later glued to a supporting substrate of greater structural integrity (e.g., particle board). This alternative method of lamination is advantageous in those instances in which a decorative laminate of greater durability and strength is desired.

Low pressure lamination processes may take many forms as presently practiced in the industry. For example, short-cycle processes utilizing a single opening press are widely used. More recently, continuous lamination processes have been employed in low pressure lamination which utilize plates, rollers or belts (e.g., double belt presses). For example, the decorative sheet and the supporting substrate could be continuously transported between opposing belts and caused to be bonded together by the application of heat and/or pressure. Such processes are well-known to those skilled in the art. In such a process, the release medium of the present invention would be caused to pass between opposing belts adjacent the decorative sheet.

Particle board and fiberboard substrates are normally additionally covered on the opposing surface opposite that covered by the decorative sheet with a backing or sealing sheet in order to avoid undesirable warping of the substrate due to the sealing of the other surface with the decorative sheet. Hardborad substrates generally do not suffer from such disadvantages and can be modified by the application of the decorative sheet to only one surface thereof.

Exemplary lamination conditions which are employed during low pressure lamination include temperatures in the range of from about 130° to 230° C. and pressures in the range of from about 100 to 500 psi. The pressure which is ultimately employed depends to a large extent upon the type of supporting substrate which is utilized. For example, pressures in the range of from about 285 to 360 psi are normally employed with particle board or fiberboard having a smooth surface. Pressures in the range of from about 360 to 430 psi are normally employed with particle board or fiberboard having a textured surface. Finally, pressures in excess of about 430 psi are normally employed with hardboard substrates. However, a pressure and/or temperature of a magnitude sufficient to cause the abrasion-resistant coating to be transferred to the surface of the decorative sheet must be employed.

With the above exceptions concerning various process differences which relate specifically to low pressure lamination, the release medium of the present invention is employed in such low pressure lamination processes in the same manner as was described previously for high pressure lamination processes.

That is, the previous description relating to the decorative sheet and the impregnation of a resin therewith, the composition of the abrasion-resistant coating including the identity of the abrasion-resistant particles and the resinous matrix, the composition of the release medium and the application of the abrasion-resistant coating thereto are equally applicable to low pressure lamination processes.

As with high pressure lamination processes, the resinous matrix of the abrasion-resistant coating and the resin employed to impregnate the decorative sheet are desirably compatible from the standpoint of visual asthetics as well as from the standpoint of processability under the pressure consolidation conditions employed. That is, the resin employed as the matrix for the abrasion-resistant coating must be capable of transfer to the decorative sheet during the pressure consolidation process, with the resin employed to impregnate the decorative sheet also being such that bonding to the adjacent supporting substrate during the pressure consolidation process occurs. It is also desirable for the resin which is employed to be of a fast cure type which enables the lamination process to be accomplished in a short period of time. The identity of such resins are well known to those skilled in the art.

As depicted in FIG. 4, in a low pressure lamination process, a release medium 19 is employed comprised of a release sheet 15 and a single abrasion-resistant coating 17 applied thereto, with the coating 17 being comprised of abrasion-resistant mineral particles dispersed in a resinous matrix. The release medium is positioned adjacent a decorative sheet 9 and a supporting self-sustaining substrate 37 for the decorative sheet to form an assembly comprised of the three members. A backing or sealing sheet 39 is optionally positioned adjacent the lower portion of the substrate 37 to seal that portion of the substrate subsequent to the lamination process.

The release medium 19 is positioned adjacent the decorative sheet 9 in a manner such that an abrasion-resistant coating is applied to the surface of the decorative sheet by the application of heat and/or pressure to the assembly via press platens 35, with sufficient heat and/or pressure being applied to the assembly to provide a decorative laminate comprised of the decorative sheet, the supporting substrate and the optional backing or sealing sheet, with the decorative sheet including an abrasion-resistant coating of a composition of abrasion-resistant particles dispersed in a resinous matrix.

The invention is additionally illustrated in connection with the following Example which is to be considered as illustrative of the present invention. It should be understood, however, that the invention is not limited to the specific details of the Example.

EXAMPLE

Various decorative laminates were produced in accordance with the present invention as follows.

A melamine resin-solvent admixture was formed to which was added alumina abrasion-resistant particles in various percentages by weight (based on the weight of the resin). The resin employed was Cymel 412 melamine resin (American Cyanamid). A surface active agent (Zonyl FSJ from DuPont) and a viscosity-increasing agent (carboxymethylcellulose) were also added to various of the samples to complete the coating composition. The coating was then applied to the surface of several sheets of aluminum foil (1 mil thick) by means of a draw down bar of sizes 8, 12, 14, 16, 18 and 20 to provide a coating of differing thicknesses on the sheets. The coatings applied ranged in weight from about 0.002 to 0.004 lbs./ft$^2$. Once applied, the coating was air dried in an oven for a few minutes at a temperature in the range of 100° to 110° C. sufficient to cure the resin to the B stage and form a release medium according to the present invention. The compositions of the various coatings which were formed are identified in Table I below.

Once formed, the coated foil sheets were employed in the production of abrasion-resistant laminates also in accordance with the present invention. Decorative sheet assemblies comprised of four sheets of phenolic-saturated core stock, one sheet of either a melamine-saturated solid decorative sheet or printed decorative sheet, and one of the coated foil sheets were formed and pressed for twelve minutes at approximately 145° C. and subsequently cooled under pressure for six minutes. A "Martin Decker" laminating press was employed at a ram pressure of 300,000 psi, which pressure is higher than would normally be employed but was employed for purposes of testing as it constituted the preset press setting.

The decorative laminates thus formed were tested for abrasion-resistance by means of a Table Abrasion Tester using the four quadrant wear test. The laminates were found to possess acceptable abrasion-resistance.

TABLE I

| Run | Resin (grams) | Solvent (grams) | Alumina Particles (wt %) | Viscosity Agent (grams) | Surface Active Agent (grams) | Draw-Down Rod # |
|---|---|---|---|---|---|---|
| 1 | 100 | 25 | 2.0 | 0 | 0.03 | 8 |
| 2 | 100 | 25 | 2.0 | 0 | 0.03 | 14 |
| 3 | 100 | 25 | 2.0 | 0 | 0.03 | 18 |
| 4 | 74 | 18.5 | 2.0 | 0 | 0.60 | 8 |
| 5 | 74 | 18.5 | 2.0 | 0 | 0.60 | 12 |
| 6 | 74 | 18.5 | 2.0 | 0 | 0.60 | 16 |
| 7 | 35.5 | 8.9 | 2.0 | 0 | 0.40 | 8 |
| 8 | 35.5 | 8.9 | 2.0 | 0 | 0.40 | 12 |
| 9 | 35.5 | 8.9 | 2.0 | 0 | 0.40 | 16 |
| 10 | 150 | 150 | 4.0 | 1.5 | 0.60 | 12 |
| 11 | 150 | 150 | 4.0 | 1.5 | 0.60 | 16 |
| 12 | 150 | 150 | 4.0 | 1.5 | 0.60 | 20 |
| 13 | 150 | 150 | 4.0 | 1.5 | 0.60 | 12 |
| 14 | 150 | 150 | 4.0 | 1.5 | 0.60 | 16 |
| 15 | 150 | 150 | 4.0 | 1.5 | 0.60 | 20 |
| 16 | 150 | 150 | 4.0 | 1.5 | 0.60 | 12 |
| 17 | 150 | 150 | 4.0 | 1.5 | 0.60 | 16 |
| 18 | 150 | 150 | 4.0 | 1.5 | 0.60 | 20 |

Solvent employed:
Isopropyl alcohol (runs 1–9)Warm water (runs 9–18)
Alumina particles employed:
Micro Abrasives Corporation Microgrit WCA-20 (runs 7–12)
Micro Abrasives Corporation Microgrit WCA-30 (runs 1–3, 13–15)
Micro Abrasives Corporation Microgrit WCA-40 (runs 4–6, 16–18)
Viscosity Agent:
Hercules, Inc. CMC 7LT (runs 10–18)

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

We claim:

1. A method for the production of decorative laminates comprising:
   (a) providing a release medium comprised of a self-sustaining release sheet having one and opposing surfaces, at least one of said surfaces of said release sheet including a B-stage cured coating of a composition comprised of abrasion-resistant mineral particles dispersed in a resinous matrix;
   (b) providing a thermosetting resin impregnated decorative sheet and positioning said decorative sheet adjacent a self-sustaining supporting substrate;
   (c) positioning said release medium adjacent said decorative sheet to form an assembly comprised of said release medium, said decorative sheet and said self-sustaining supporting substrate, said release medium being positioned adjacent said decorative sheet in a manner such that an abrasion-resistant coating is formed on the surface of said decorative sheet by transfer of said coating from said release medium by the application of sufficient heat and pressure to said assembly to accomplish said transfer; and
   (d) applying sufficient heat and pressure to said assembly to provide a decorative laminate comprised of said decorative sheet and said self-sustaining substrate which decorative sheet includes on the surface thereof an abrasion-resistant coating of a composition comprised of abrasion-resistant mineral particles dispersed in a resinous matrix.

2. The method of claim 1 wherein said self-sustaining release sheet is selected from the group consisting of paper, metallic foil, a paper-metallic foil laminate and a synthetic resin film.

3. The method of claim 1 wherein said release sheet is comprised of a synthetic resin selected from the group consisting of polypropylene, polybutylene and polyethylene terephthalate.

4. The method of claim 1 wherein said release sheet is comprised of a metallic foil.

5. The method of claim 4 wherein said foil is an aluminum foil.

6. The method of claim 2 wherein said release sheet is comprised of a paper-metallic foil laminate.

7. The method of claim 6 wherein said foil laminate is comprised of a paper substrate and outer layers of aluminum foil.

8. The method of claim 1 wherein said at least one release medium also includes a release coating.

9. The method of claim 1 wherein said at least one release medium also includes a non-sanding coating.

10. The method of claim 1 wherein said abrasion-resistant particles are selected from the group consisting of silica, alumina, alundum, corundum, emery, tungsten carbide, beryllium carbide, silicon carbide, aluminum boride, boron carbide, diamond dust and mixtures thereof.

11. The method of claim 10 wherein said particles comprise alumina particles.

12. The method of claim 1 wherein said particles range in size from about 10 micron average particle size to about 75 micron average particle size.

13. The method of claim 1 wherein said resinous matrix comprises a melamine resin.

14. The method of claim 1 wherein said mineral particles are present in an amount ranging from about 2 to 15 percent by weight based on the weight of the resin.

15. The method of claim 1 wherein said decorative laminate is formed by the application of pressure of at least 500 psi.

16. The method of claim 1 wherein said decorative laminate is formed by the application of a pressure of less than 500 psi.

17. The method of claim 15 wherein said self-sustaining substrate comprises at least one core sheet.

18. The method of claim 17 wherein multiple core sheets are employed.

19. The method of claim 1 wherein the coating on said release sheet further comprises from about 0.5 to about 4.0 weight percent of a viscosity increasing composition to prevent settling or clumping of the abrasion-resistant particles in the resinous mixture.

20. The method of claim 1 wherein said one and said opposing surfaces of the self-sustaining release sheet include a B-stage cured coating of a composition comprised of abrasion-resistant particles dispersed in a resinous mixture and two assemblies comprised of a thermosetting resin impregnated decorative sheet and substrate are positioned on opposite sides of said release sheet with the decorative sheet of one of said assemblies being positioned adjacent one coated surface of said release sheet and the decorative sheet of the other of said assemblies being positioned adjacent the opposing coated surface of said release sheet whereby upon consolidation by heat and pressure, an abrasion-resistant coating is formed on each of said one and said other decorative sheets and two abrasion-resistant decorative laminates are formed simultaneously.

21. The method of claim 20 wherein the coating on said release sheet further comprises from about 0.5 to about 4.0 weight percent of a viscosity increasing composition to prevent settling or clumping of the abrasion-resistant particles in the resinous mixture.

22. The method of claim 20 wherein said self-sustaining release sheet is selected from the group consisting of paper, metallic foil, a paper-metallic foil laminate and a synthetic resin film.

23. The method of claim 20 wherein said release sheet is comprised of a synthetic resin selected from the group consisting of polypropylene, polybutylene and polyethylene terephthalate.

24. The method of claim 20 wherein said release sheet is comprised of a metallic foil.

25. The method of claim 24 wherein said foil is an aluminum foil.

26. The method of claim 22 wherein said release sheet is comprised of a paper-metallic foil laminate.

27. The method of claim 26 wherein said foil laminate is comprised of a paper substrate and outer layers of aluminum foil.

28. The method of claim 20 wherein said at least one release medium also includes a release coating.

29. The method of claim 20 wherein said at least one release medium also includes a non-sanding coating.

30. The method of claim 20 wherein said abrasion-resistant particles are selected from the group consisting of silica, alumina, alundum, corundum, emery, tungsten carbide, beryllium carbide, silicon carbide, aluminum boride, boron carbide, diamond dust and mixtures thereof.

31. The method of claim 30 wherein said particles comprise alumina particles.

32. The method of claim 20 wherein said particles range in size from about 10 micron average particle size to about 75 micron average particle size.

33. The method of claim 20 wherein said resinous matrix comprises a melamine resin.

34. The method of claim 20 wherein said mineral particles are present in an amount ranging from about 2 to 15 percent by weight based on the weight of the resin.

* * * * *